US009298227B2

(12) United States Patent
Lee et al.

(10) Patent No.: US 9,298,227 B2
(45) Date of Patent: Mar. 29, 2016

(54) FULL HEIGHT I/O BRACKET FOR LOW PROFILE EXPANSION CARD

(71) Applicant: Dell Products L.P., Round Rock, TX (US)

(72) Inventors: Chih-Hsiang Lee, Taoyuan (TW); Yao-Chien Lien, Taipei (TW); Hsien-Chih Wu, Chang-Chung (TW); Chien Hung Chou, Taipei (TW); Kuo-Chih Lin, Taipei (TW); Martin Hardis, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 497 days.

(21) Appl. No.: 13/893,644

(22) Filed: May 14, 2013

(65) Prior Publication Data

US 2014/0340834 A1     Nov. 20, 2014

(51) Int. Cl.
*G06F 1/16*     (2006.01)
*G06F 1/18*     (2006.01)

(52) U.S. Cl.
CPC ............... *G06F 1/185* (2013.01); *G06F 1/188* (2013.01); *Y10T 29/49124* (2015.01)

(58) Field of Classification Search
CPC .......... G06F 1/185; G06F 1/186; G06F 1/888
See application file for complete search history.

(56) References Cited

U.S. PATENT DOCUMENTS

| | | | | | |
|---|---|---|---|---|---|
| 4,840,570 | A | * | 6/1989 | Mann, Jr. ........... | H01R 12/7005 361/787 |
| 5,251,109 | A | * | 10/1993 | Baitz .................... | H05K 7/1429 174/260 |
| 5,576,935 | A | * | 11/1996 | Freer ...................... | G06F 1/184 211/41.17 |
| 6,469,474 | B2 | * | 10/2002 | Bunker .................. | G11C 5/141 320/132 |
| 6,585,534 | B2 | * | 7/2003 | Llapitan .............. | H01L 23/4093 257/E23.086 |
| 7,007,184 | B2 | * | 2/2006 | Sabotta ............... | G06F 13/4022 713/340 |
| 7,103,694 | B2 | * | 9/2006 | Schumacher ....... | G06F 13/4086 326/30 |
| 7,397,671 | B2 | * | 7/2008 | Cleveland ............... | G06F 1/184 361/679.55 |
| 7,672,141 | B2 | * | 3/2010 | Middleton .............. | G06F 1/183 361/785 |
| 2014/0313661 | A1 | * | 10/2014 | Lin .......................... | G06F 1/20 361/679.32 |
| 2014/0340834 | A1 | * | 11/2014 | Lee ......................... | G60F 1/185 361/679.32 |

* cited by examiner

*Primary Examiner* — Ramon M Barrera
(74) *Attorney, Agent, or Firm* — Isidore PLLC

(57) ABSTRACT

An expansion card includes a mounting bracket with a full height I/O panel with a top mounting panel attached thereto extending orthogonally away. A low profile printed circuit board assembly (PCBA) is physically attached to at least one of the top mounting panel and the full height I/O panel, and the mounting bracket and low profile PCBA define a full height expansion card. The low profile PCBA has a card edge that is insertably connectable to an I/O connector of an information handling system (IHS) to communicate with other components of the IHS. A full height heat sink is attached to the low profile PCBA and extends across a portion of the top mounting panel, providing increased heat dissipation for functional components of the low profile PCBA during operation of the low profile PCBA. A battery compartment is mounted on the mounting panel and supplies power to the functional components.

20 Claims, 7 Drawing Sheets

FULL HEIGHT I/O BRACKET FOR LOW PROFILE EXPANSION CARD

BACKGROUND

1. Technical Field

The present disclosure generally relates to information handling systems and in particular to expansion cards for insertion into information handling systems. Still more particularly, the disclosure relates to design and configuration of expansion cards for use as high profile expansion cards.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems include add-in or expansion cards. In conventional implementations, an add-in card has a low profile heat sink and battery compartment that is supported by a low profile printed circuit board assembly (PCBA). Increasingly, consideration is being given to mount higher capacity electronic components on a low profile PCBA; however, such components would generate an increased amount of thermal energy that would exceed the capacity of the current low profile heat sink. The size of the low profile PCBA is not conducive to a larger heat sink, and increasing the size of the heat sink to cover more of the low profile PCBA undesirably results in having to remotely install the battery component. However, based on operating metrics of the PCBA and convenience of implementation, it is desirable for the battery to be locally provided.

BRIEF SUMMARY

Disclosed are an expansion card, an information handling system, and a method for producing a full height expansion card that enables greater heat dissipation and localized power availability for low profile printed circuit board assembly (PCBA). The expansion card includes a mounting bracket with a full height I/O panel with a top mounting panel attached thereto extending orthogonally away. A low profile printed circuit board assembly (PCBA) is physically attached to at least one of the top mounting panel and the full height I/O panel, and the mounting bracket and low profile PCBA define a full height expansion card that can accommodate a full height heat sink. The low profile PCBA has a card edge that is insertably connectable to an I/O connector of an information handling system (IHS) to communicate with other components of the IHS. A full height heat sink is attached to the low profile PCBA and extends across a portion of the top mounting panel, providing increased heat dissipation for functional components of the low profile PCBA during operation of the low profile PCBA. A battery compartment is mounted on the mounting panel and supplies power to the functional components.

According to at least another aspect of the present disclosure, an information handling system has an enclosure having at least one I/O connector in communication with enclosed components of the information handling system. An I/O panel frame is attached across an opening in the enclosure. The I/O panel of the expansion card is insertably connected to the I/O connector and physically connected to the I/O panel frame. According to at least one aspect of the present disclosure, the full height I/O panel is sized for insertion in the I/O panel frame of the enclosure of the information handling system.

According to at least an additional aspect of the present disclosure, a method provides a full height expansion card. A mounting bracket is manufactured having (i) a full height input/output (I/O) panel sized for insertion in an I/O panel frame extended across an opening of an enclosure of an information handling system and (ii) a top mounting panel attached to the full height I/O panel and extending orthogonally away from the full height I/O panel. A low profile PCBA is physically attached to at least one of the top mounting panel and the full height I/O panel, and the mounting bracket and low profile PCBA define a full height expansion card. A full height heat sink is attached to the low profile PCBA and the full height heat sink extends across the top mounting panel. The full height heat sink enables efficient dissipation of heat generated by the low profile PCBA away from one or more functional components of the low profile PCBA.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
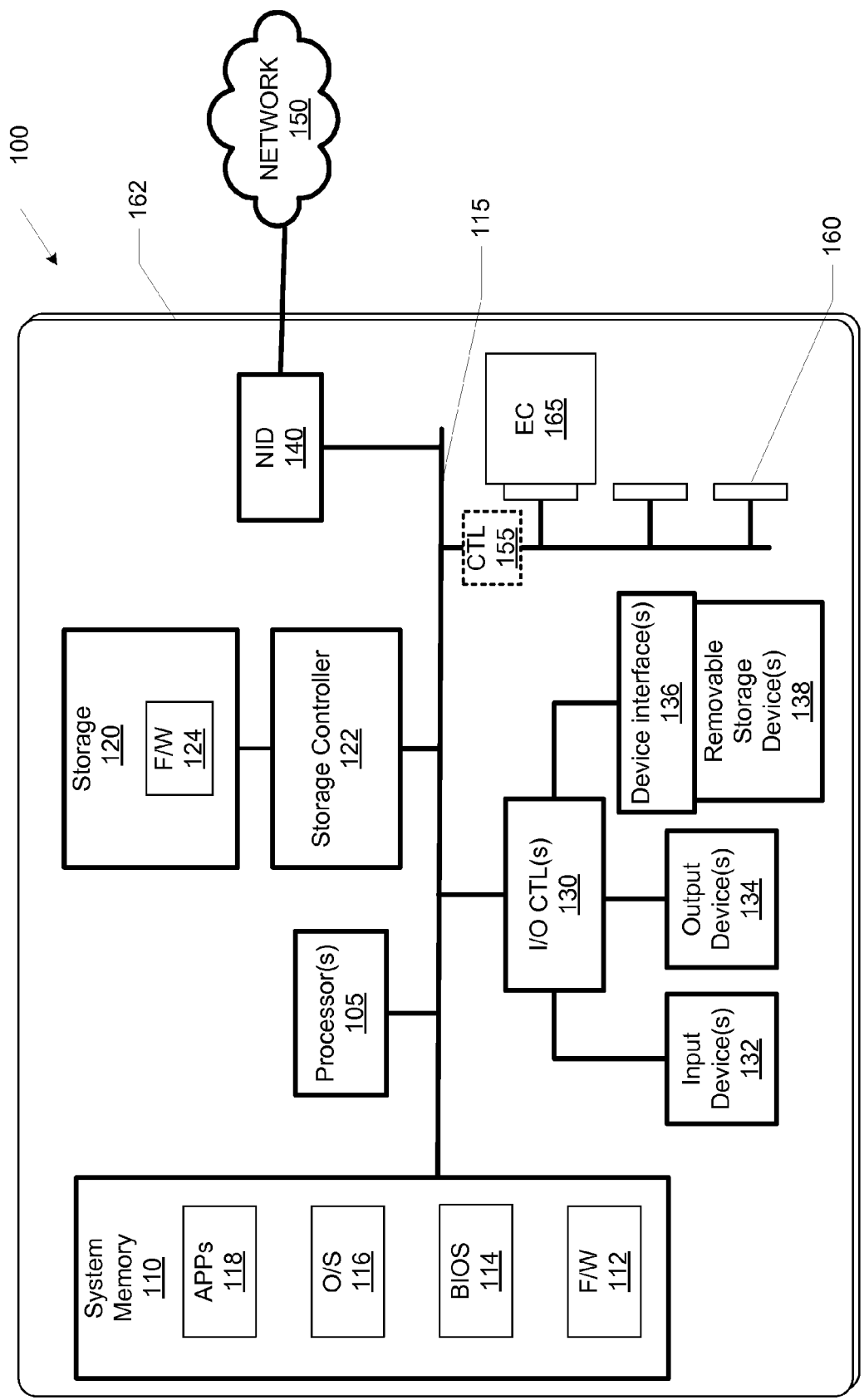
FIG. 1 illustrates a block diagram of an example information handling system within which various aspects of the disclosure can be implemented, according to one or more embodiments.

The described embodiments of the disclosure provide an expansion card, an information handling system, and a method for producing a full height expansion card that enables greater heat dissipation and localized power availability for low profile printed circuit board assembly (PCBA). The expansion card includes a mounting bracket with a full height I/O panel with a top mounting panel attached thereto extending orthogonally away. A low profile printed circuit board assembly (PCBA) is physically attached to at least one of the top mounting panel and the full height I/O panel, and the mounting bracket and low profile PCBA define a full height expansion card that can accommodate a full height heat sink. The low profile PCBA has a card edge that is insertably connectable to an I/O connector of an information handling system (IHS) to communicate with other components of the IHS. A full height heat sink is attached to the low profile PCBA and extends across a portion of the top mounting panel, providing increased heat dissipation for functional components of the low profile PCBA during operation of the low profile PCBA. A battery compartment is mounted on the mounting panel and supplies power to the functional components.

According to one aspect, the present disclosure provides a solution for converting a low profile printed circuit board assembly (PCBA) into a full height expansion card, with corresponding heat dissipating capabilities as a high profile PCBA. A mounting bracket attached to an input/output (I/O) panel of the full height expansion card can provide additional retention for a battery module and for a heat sink. In an exemplary implementation for PowerEdge Raid Controller (PERC) cards, a PERC 9 heat sink is larger than a PERC 8 heat sink. For backward compatibility, the PERC 9 heat sink is attachable to a low profile printed circuit board assembly (PCBA) that may have the same form, fit and function. To avoid having to relocate a battery compartment that was used on the PERC 8, the full height I/O bracket provides a battery space for the battery compartment and provides additional area for underlying and supporting a portion of the PERC 9 heat sink. By retaining the battery within close proximity to a printed wiring assembly (PWA) of the low profile PCBA, installation of a short electrical wiring connector provides installation simplicity and higher electrical efficiency than a long electrical wiring connector that would otherwise be required.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is a local storage controller 122 coupled to local storage 120 within which can be stored software and one or more sets of data (not specifically shown). As shown, system memory 110 can include therein a plurality of modules, including firmware (F/W) 112, basic input/output system (BIOS) 114, operating system (O/S) 116 and application(s) 118. The various software and/or firmware modules have varying functionality when their corresponding program code is executed by processor(s) 105 or other processing devices within IHS 100.

IHS 100 further includes one or more input/output (I/O) controllers 130 which support connection to and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interface(s) 136, such as an optical reader, a universal serial bus (USB), a card reader, Personal Computer Memory Card International Association (PCMCIA) port, and/or a high-definition multimedia interface (HDMI), can be associated with IHS 100. Device interface(s) 136 can be utilized to enable data to be read from or stored to corresponding removal storage device(s) 138, such as a compact disk (CD), digital video disk (DVD), flash drive, or flash memory card. In one or more embodiments, device interface(s) 136 can also provide an integration point for connecting other device(s) to IHS 100. In such implementation, device interface(s) 136 can further include General Purpose I/O interfaces such as I²C, SMBus, and peripheral component interconnect (PCI) buses.

IHS 100 comprises a network interface device (NID) 140. NID 140 enables IHS 100 to communicate and/or interface with other devices, services, and components that are located external to IHS 100. These devices, services, and components can interface with IHS 100 via an external network, such as example network 150, using one or more communication protocols. Network 150 can be a local area network, wide area network, personal area network, and the like, and the connection to and/or between network 150 and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

Processing capabilities of the example IHS 100 can be readily configurable by providing one or more I/O connectors 160. For clarity, three I/O connectors 160 are depicted that are internal to an enclosure 162 that houses at least a portion of the example IHS 100. One of the I/O connectors 160 is in communication with an expansion card 165, and the I/O connector serves as an interface between the expansion card 165 and other components of the information handling system 100. I/O connectors can be coupled to and/or controlled by a separate controller module 155, which is illustrated using dashed lines to indicate that the module is optional and not necessarily a part of or provided within IHS 100. It should be appreciated that the example IHS 100 may have a distributed architecture with certain components remotely accessed. Alternatively, or in addition, the expansion card 165 may communicate with components that are accessible via the network 150.

The example expansion card 165 can provide additional processing capabilities and backward compatibility for an information handling system 100. Some information handling systems include add-in or expansion cards 165 such as, for example, PowerEdge Raid Controller (PERC) cards wherein "RAID" refers to redundant array of independent disks. A RAID system is a data storage system wherein data is distributed across a group of storage hard disk drives functioning as a small storage unit. Often, information stored on each disk is duplicated on other disks in the array, creating redundancy to ensure no information is lost if disk failure occurs.

Figure 2:
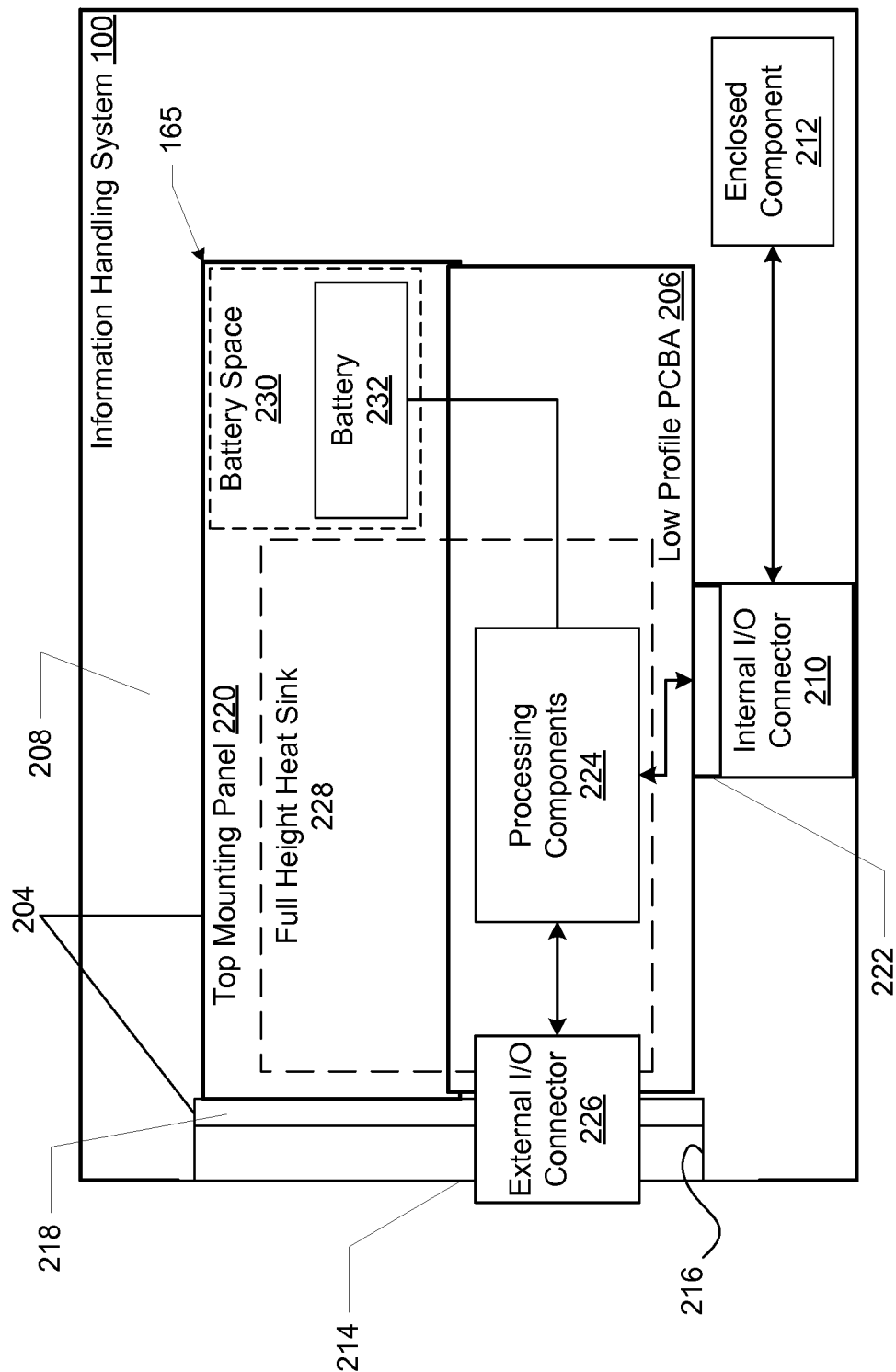
FIG. 2 illustrates a block diagram of an example expansion card with connection to/within an information handling system, according to one or more embodiments.

FIG. 2 provides a more detailed view of the expansion card 165 inserted into an I/O connector 160 of IHS 100. Expansion card 165 generally includes a full height mounting bracket 204, which allows the expansion card 165 to be interchangeably referred to as a full height expansion card 165. This configuration of a full height expansion card 165 is provided, even though the processing capabilities can be based upon a low profile printed circuit board assembly (PCBA) 206. Thereby, support for additional processing capability is provided by giving additional real estate (space) for mounting of components as well as providing other structural features, such as a larger heat sink.

The full height I/O panel 218 is attached to a top mounting panel 220 to form the full height mounting bracket 204. For example, the attachment of full height I/O panel 218 to top mounting panel 220 can be achieved by stamp forming of sheet metal into a single formed part. As another example, the attachment can be achieved by fastening, affixing or assembling separate components to form the full height mounting bracket 204. As an additional example, the attachment can be achieved by molding the full height mounting bracket 204 having the top mounting panel 220 and full height I/O panel 218. As a further example, the attachment can be achieved by a combination of some or all of the aforementioned processes.

In some implementations, one or more processing components 224 incorporated into the low profile PCBA 206 have additional interconnectivity and support requirements that are provided by the expansion card 165. For example, low profile PCBA 206 can include an external I/O connector 226 that can be in electronic communication with the one or more processing components 224. Alternatively or in addition, the external I/O connector 226 can be connected through the low profile PCBA 206 and internal I/O connector 210 to enclosed component 212 of the IHS 100. The external I/O connector 226 can be attached through the full height I/O panel 218 to be externally exposed at the I/O panel frame 214 for wired or wireless connection.

As shown, structural support for the larger heat sink and battery compartment is provided by adding a top mounting panel to form a full height expansion card on which is provided a full height heat sink. Thus, the mounting bracket 204 can support the performance requirements of one or more processing components 224 by structurally supporting the larger heat sink, which in turn enables use of more advanced processing components which provide increased heat dissipation. A full height heat sink 228 that is in contact with the one or more processing components 224 can extend over portions of both the low profile PCBA 206 and the top mounting panel 220. Moreover, in one embodiment, in addition to structurally supporting the full height heat sink 228, the material of the top mounting panel 220 may assist by dissipating heat of functional components, such as the one or more processing components 224. Alternatively, or in addition, the top mounting panel 220 of the full height mounting bracket 204 of the expansion card 165 can provide a battery space 230 for mounting of a battery compartment/holder for housing a battery 232 to supply backup power to the one or more processing components 224.

In an exemplary aspect, consistent with one or more embodiments, the IHS 100 has an enclosure 208 having at least one internal I/O connector 210 in communication with enclosed component 212 of the IHS 100. Engagement between the internal I/O connector 210 and the card I/O connector 222 of the low profile PCBA 206 provides a measure of structural support in addition to electronic interconnectivity. Additional structural support to the expansion card 165 is provided by engagement between an I/O panel frame 214 that is attached across an opening 216 in the enclosure 208 and a full height I/O panel 218 of the expansion card 165. The full height mounting bracket 204 can be sized for insertion in the full height I/O panel frame 214 by having a top mounting panel 220 attached to the full height I/O panel 218 and extending orthogonally away from the full height I/O panel. For instance, the full height I/O panel 218 may be inserted into the I/O panel frame 214 simultaneously with or at least along a common plane of movement with insertion of a portion of the low profile PCBA 206, such as a card edge 222, into the internal I/O connector 210.

Figure 3:
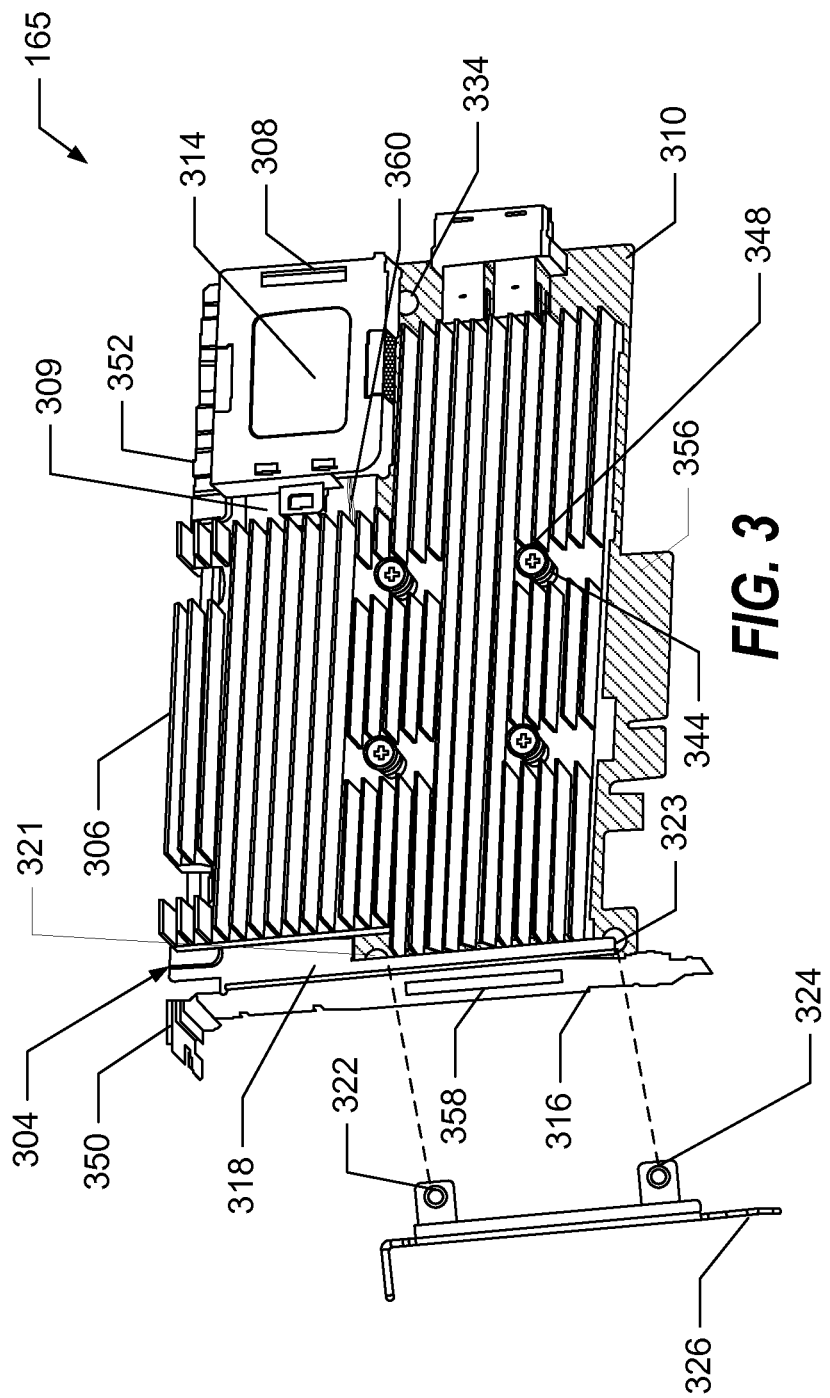
FIG. 3 illustrates an isometric front side view of an expansion card, according to one embodiment.
Figure 4:
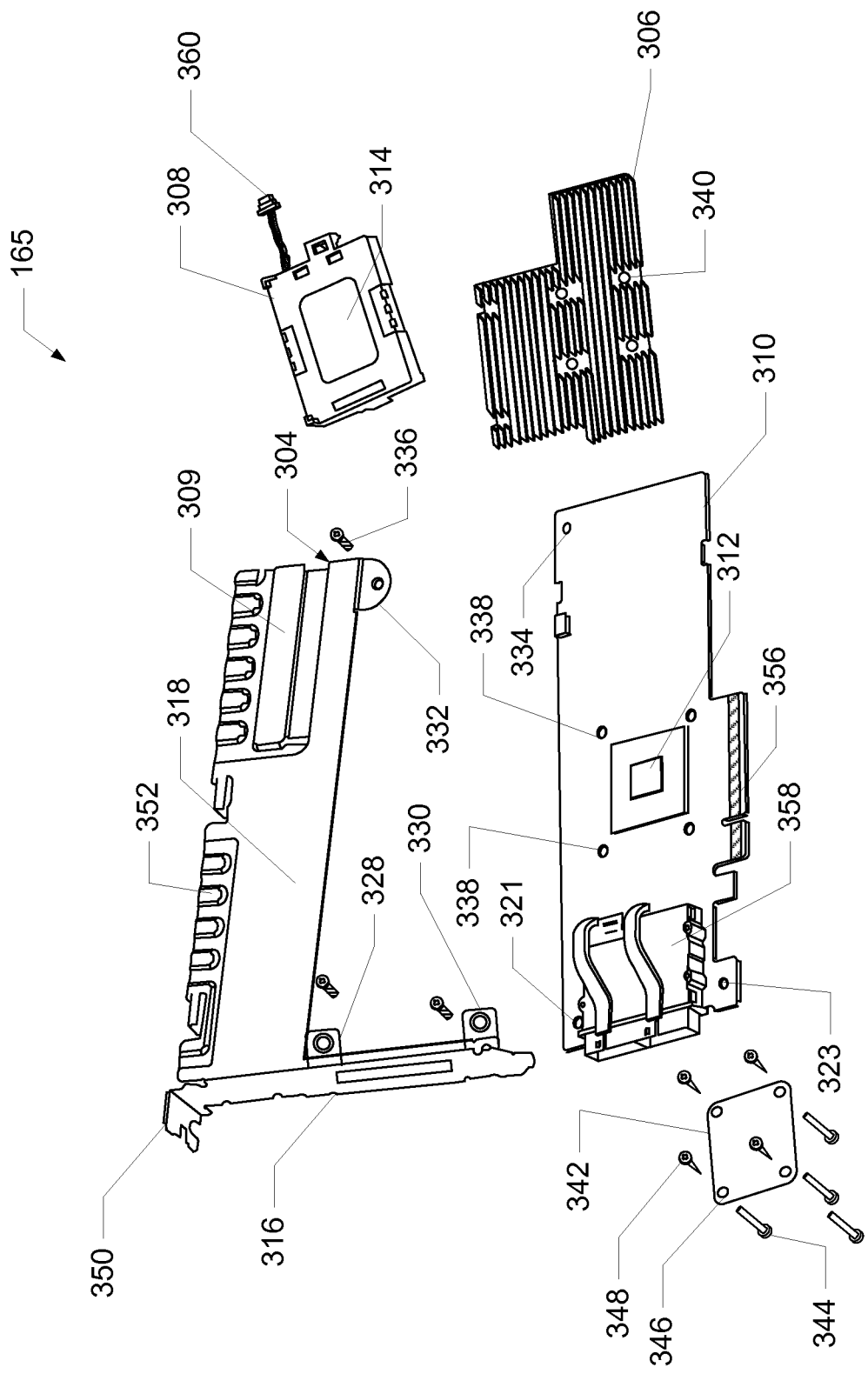
FIG. 4 illustrates an isometric exploded front view of the expansion card of FIG. 2m according to one embodiment.

With reference to FIGS. 3-4, an exploded view of exemplary expansion card 165 is depicted. Expansion card 165 has a mounting bracket 304 that supports a full height heat sink 306 and allows for mounting of a battery compartment 308. The full height heat sink 306 is configured such that the heat sink does not cover a distal portion of the mounting bracket 304 to present a battery space 309 for placement of the battery compartment 308.

As one example, the expansion card 165 can be PERC 9 card for performing RAID operations. During normal operations, the full height heat sink 306 dissipates an increased amount of heat generated by functional or processing components 312 (FIG. 4). During operation of the functional or processing components 312, user data may be transferred to/from the one or more functional or processing components 312 from/to the RAID hard disk drives (not shown in FIGS. 3-4). As part of the transfer, data can be stored in volatile memory such as memory cache as part of the transfer of the data to/from the RAID disk drives. If a system power loss occurs it is advantageous to be able to maintain the data transfer of the data that has already been staged in the memory cache. Thus, a battery module 314 inserted into the battery compartment 308 can be used as a backup battery system to provide power to the cache memory so that the cache memory does not lose the data that has not yet been transferred. The battery power may thus power the cache memory until the system power becomes stable again so that data in the cache may then be reliably transferred to the RAID hard disk drives.

The expansion card 165 is configured for insertion into an information handling system as a full height expansion card by virtue of the mounting bracket 304. In particular, the mounting bracket 304 includes a full height input/output I/O panel 316 and a top mounting panel 318 attached to the full height I/O panel 316 and extending orthogonally away from the full height I/O panel 316. The low profile PCBA 310 is physically attached to one or both of the top mounting panel 318 and the full height I/O panel 316. For example, the low profile PCBA 310 can have a pair of mounting holes 321, 323 spaced for attachment to upper and lower tabs 322, 324 of a low profile I/O panel 316. A tab 322 on the top mounting panel 318 is attached to a hole 334 through a top inward corner of the low profile PCBA 310. As shown in FIG. 4, bolts 336 fasten the tabs 328, 330, 332 to holes 321, 323, 334.

The full height I/O panel 316 of the mounting bracket 304 can also have a pair of upper and lower tabs 328, 330 presenting respective mounting holes identically positioned to the low profile I/O panel 326. Thereby interchangeability is achieved for the low profile PCBA 310 between full height and low profile installations. The mechanical connection of the various individual components allows for backward compatibility to a low profile PCBA 310, by attaching a low profile heat sink and a low profile I/O panel 316 in place of the high profile heat sink and full height I/O panel.

Interchangeability is also facilitated by the mounting of the full height heat sink 306. In the illustrated embodiment, the low profile In FIG. 4, PCBA 310 has four holes 338 rectilinearly spaced about the square presented by the functional or processing component 312. The full height heat sink 306 has the same pattern of holes 340, which is also identical to a low profile heat sink (not shown). The full height heat sink 306 is held into close thermal contact with the functional or processing component 312 by attachment of a mounting plate 342. Four posts 344 are affixed to corner holes 346 in the mounting plate 342 to pass through holes 338 in the low profile PCBA 310 and holes 340 in the full height heat sink 306. Distal ends of the posts 344 receive screws 348 that spread posts 344 presenting a locking, ratcheted surface to the full height heat sink 306.

Other features depicted in FIGS. 3-4 include a full height flange 350 on the full height I/O panel 316 for fastening in the expansion card 165. In addition, an unattached lengthwise edge of the top mounting panel 318 has an embossed surface 352 to frictionally engage a card holder 354 (see FIG. 6). Interconnectivity is provided by a circuit edge 356 of the low profile PCBA 310 and an external I/O connector 358. Since the top mounting panel 318 is not necessarily part of a printed wiring assembly (PWA), the battery compartment 308 can connect electrical power to the low profile PCBA 310 via a short wired battery connector 360.

In an exemplary aspect, the mounting bracket 304 can be substantially or entirely sheet metal, such as being stamped formed into a single sheet metal stamping part. Such a device can be economically manufactured, can provide durability and structural strength, and can provide thermal and electrical conductivity. For example, the full height I/O panel 316 can serve as part of protective measures against electromagnetic interference. However, embodiments consistent with the present disclosure can be formed of other materials, at least in part.

Figure 5:
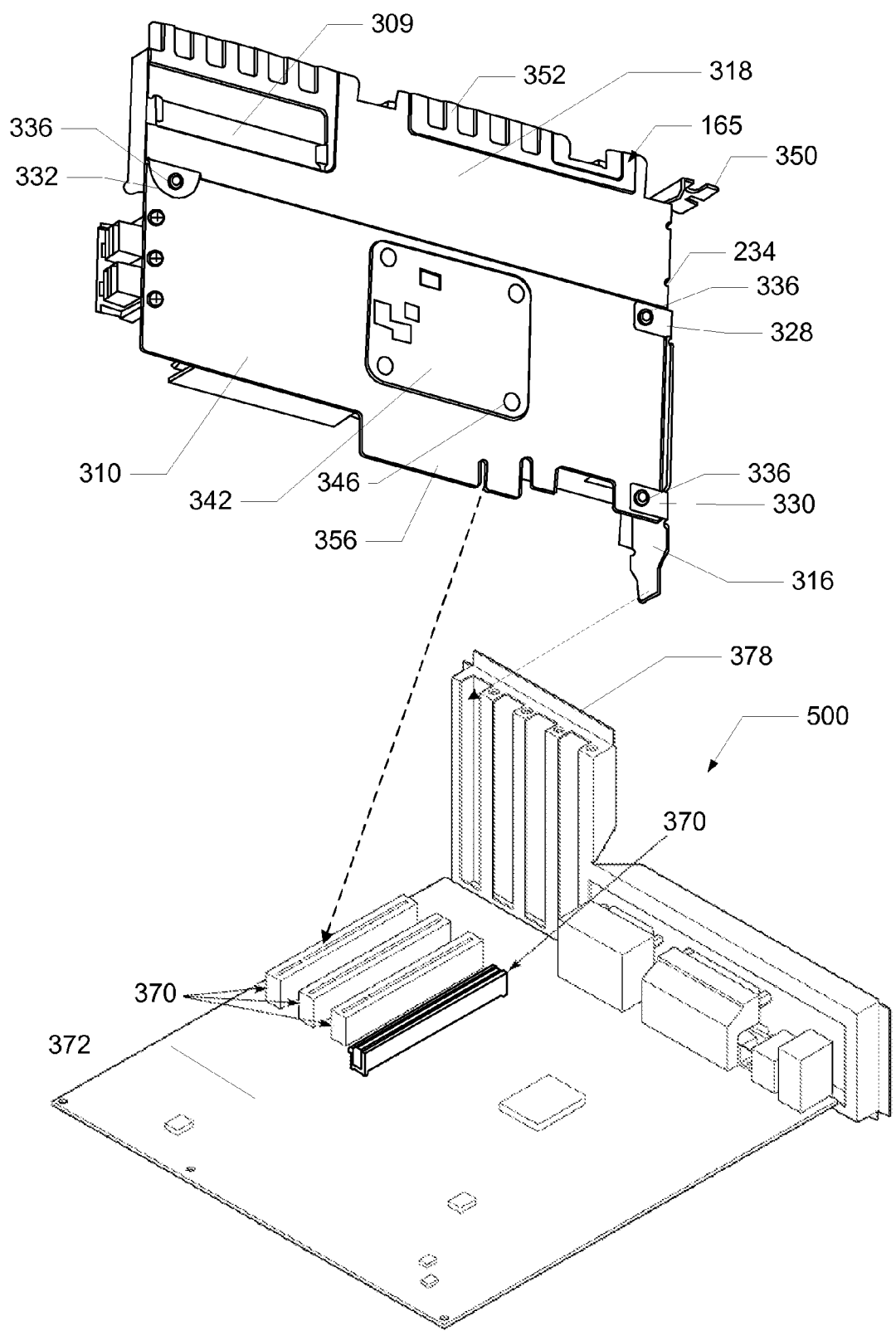
FIG. 5 illustrates an isometric view of a portion of an enclosure of the example information handling system of FIG. 1 and a back side view of the expansion card of FIG. 2.
Figure 6:
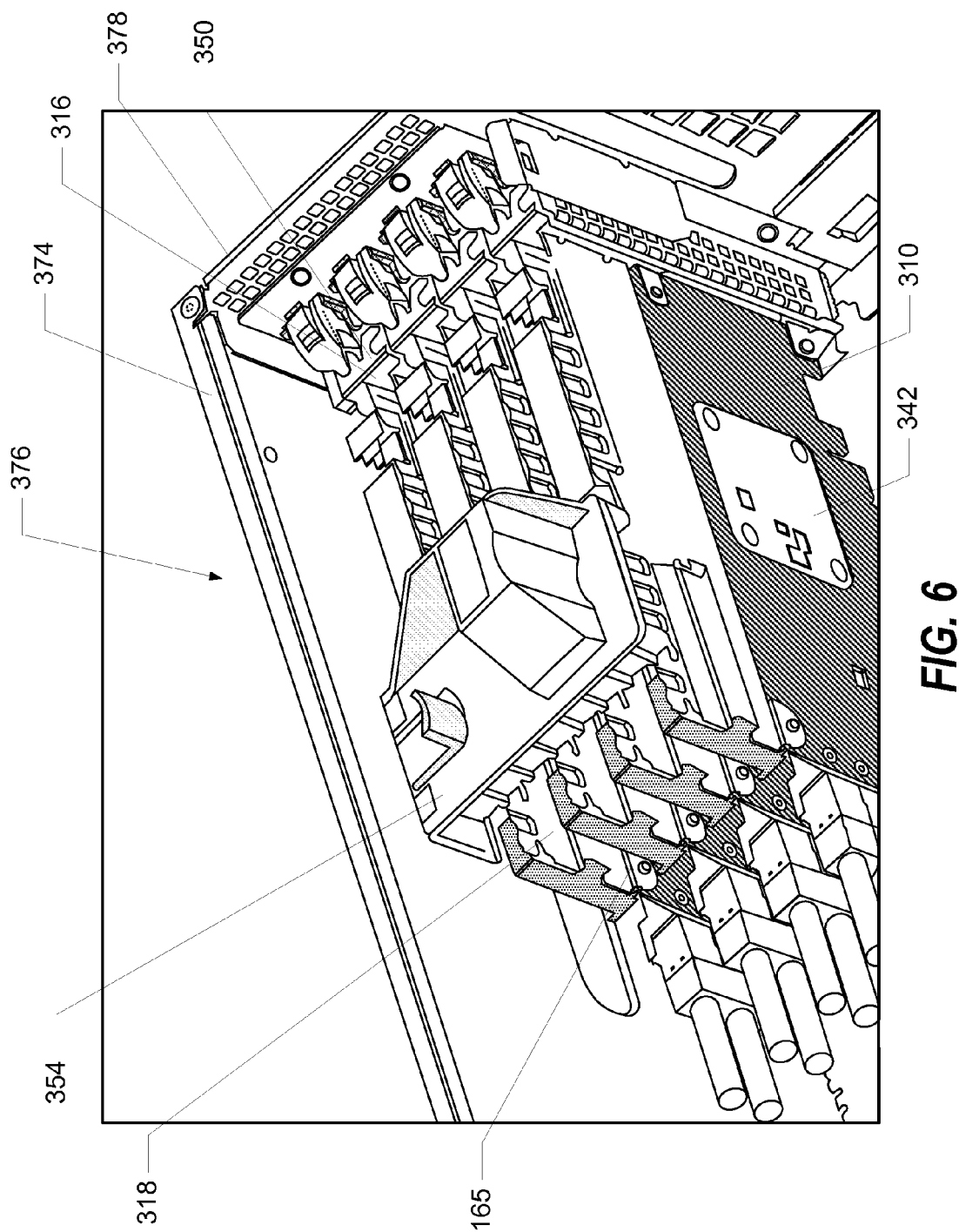
FIG. 6 illustrates a top isometric view of an assembled expansion card in the enclosure of FIG. 5.

With reference to FIGS. 5-6, for clarity, a convention used herein is for the expansion card 165 to be inserted in a downward vertical plane with the top mounting panel 318 being above the low profile PCBA 310, which in turn is above the internal I/O connector 370 mounted on a bottom surface 372 of an enclosure of an IHS 100. The full height I/O panel 316 is also inserted along a vertical plane into an I/O panel frame 378 installed within an opening in the enclosure. The full height I/O panel 316 is orthogonal to the top mounting panel 318 and low profile PCBA 310. While this convention is maintained throughout the several views, it should be appreciated that expansion card 165 may be oriented horizontally or at angles other than a perpendicular (or close to perpendicular) angle.

Figure 7:
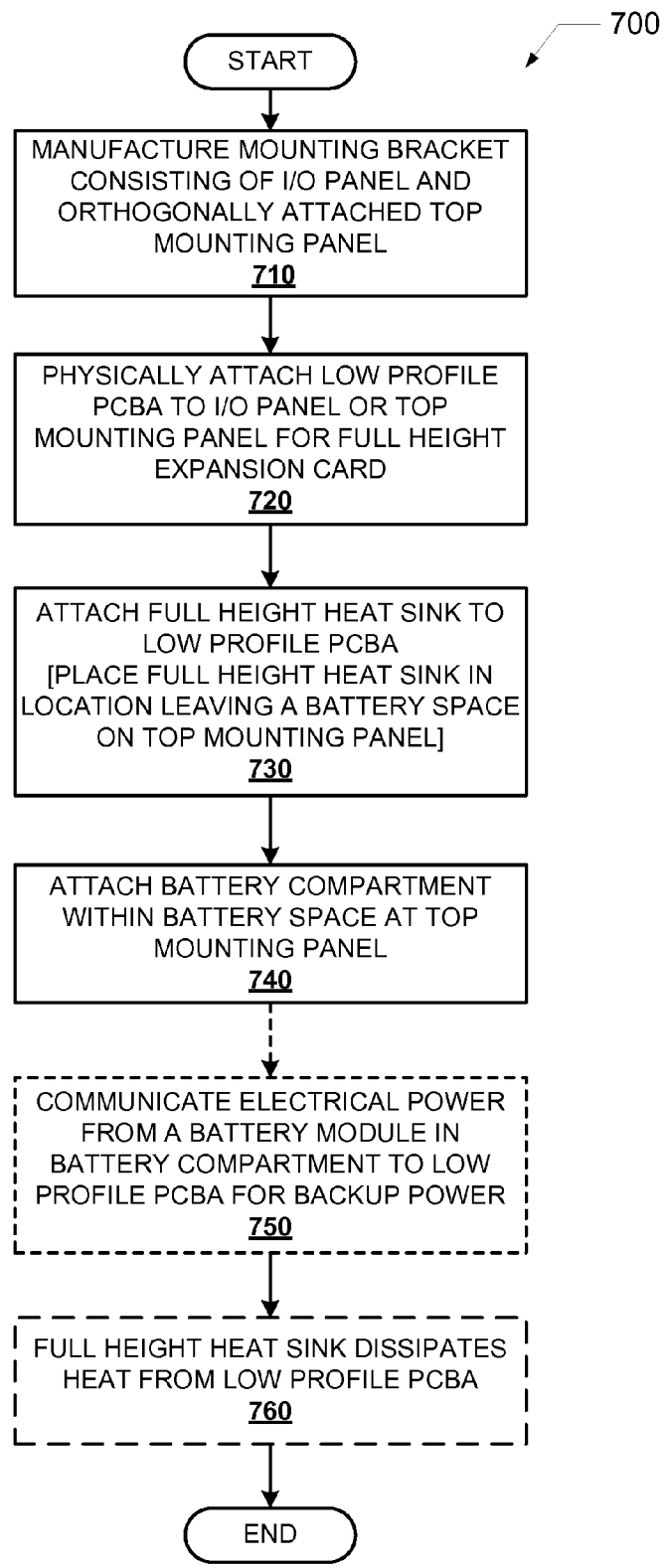
FIG. 7 illustrates a flow diagram of a method for generating a full height expansion card with a full height heat sink using a low profile Printed Circuit Board Assembly (PCBA), according to one embodiment.

Referring to FIG. 7, there is illustrated an example method 700 by which a full height expansion card consistent with one or more aspects of the present disclosure can be manufactured and/or assembled. Method 700 begins at start block. Method 700 includes manufacturing a mounting bracket having (i) a full height I/O panel sized for insertion into an I/O panel frame extended across an opening of an enclosure of an information handling system and (ii) a top mounting panel attached to the full height I/O panel and extending orthogonally away from the full height I/O panel (block 710). The manufacturing is completed via one or more manufacturing processes, as described herein. Method 700 then provides physically attaching a low profile PCBA to at least one of the top mounting panel and the full height I/O panel, thereby defining a full height expansion card (block 720). Following, method 700 includes attaching a full height heat sink to the low profile PCBA (block 730). The full height heat sink efficiently dissipates heat generated by the low profile PCBA away from one or more functional components of the low profile PCBA and enables a denser concentration of processing components and/or placement of more advanced (i.e., higher heat dissipating) processing components on the low profile PCBA.

In one or more embodiments, the method 700 further provides that the full height heat sink is configured to and extends across a portion of the top mounting panel, leaving a space for the battery compartment and battery on the top mounting panel. Method 700 also includes attaching, within the battery space, a battery compartment to the top mounting panel (block 740). With the battery inserted and attached to the PCBA's processing components, the battery communicates backup electrical power to the processing component incorporated in the low profile PCBA (block 750). The full height heat sink dissipates heat from the low profile PCBA (block 760). The method then ends at end block.

Alternatively, or in addition, method 700 may further provide for backward compatibility for a low profile PCBA that conventionally was attached to an upper and lower tab of a low profile I/O panel. To achieve the backward compatibility, a low profile heat sink is mounted on the low profile PCBA using the same attachment holes that were utilized for the full height heat sink. By providing a full height expansion card, the method can further provide for inserting the expansion card into an internal I/O connector and I/O panel frame of an enclosure of an IHS. Also, in one embodiment, the method can include embossing a top edge of the top mounting panel, such that a card holder can frictionally engage the top edge in a manner similar to gripping a thicker PCBA.

In the above described flow chart, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An expansion card for an information handling system, the expansion card comprising:
   a mounting bracket comprising a full height input/output (I/O) panel sized for insertion in an I/O panel frame of an enclosure and comprising a top mounting panel attached to the full height I/O panel and extending orthogonally away from the full height I/O panel; and
   a low profile printed circuit board assembly (PCBA) physically attached to at least one of the top mounting panel and the full height I/O panel, wherein the mounting bracket and the low profile PCBA define a full height expansion card; and
   a full height heat sink attached to the low profile PCBA and extending across a portion of the top mounting panel to provide increased heat dissipation for functional components of the low profile PCBA during operation of the low profile PCBA.

2. The expansion card of claim 1, further comprising a mounting plate positioned on a back side of the low profile PCBA and fastened through at least two holes in the low profile PCBA to the full height heat sink.

3. The expansion card of claim 1, wherein the low profile PCBA further comprises a processing component that generates heat dissipated by the full height heat sink, wherein the expansion card further comprises a battery space on the top mounting panel and a battery compartment attachable to the top mounting panel within the battery space and in electrical communication with the processing component.

4. The expansion card of claim 1, wherein the low profile PCBA comprises a pair of mounting holes spaced for attachment to upper and lower tabs of a low profile I/O panel, and wherein the full height I/O panel of the mounting bracket comprises a pair of tabs presenting respective mounting holes identically positioned to the low profile I/O panel.

5. The expansion card of claim 4, wherein the at least two holes through the low profile PCBA are identically spaced to at least two holes on a low profile heat sink to enable interchangeability.

6. The expansion card of claim 5, wherein an unattached lengthwise edge of the top mounting panel comprises an embossed surface to frictionally engage a card holder of a device in which the card is inserted.

7. The expansion card of claim 1, wherein the full height I/O panel and the top mounting panel comprises a single sheet metal stamping part.

8. An information handling system, comprising:
an enclosure having at least one input/output (I/O) connector in communication with enclosed components of the information handling system;
an I/O panel frame attached across an opening in the enclosure; and
an expansion card communicatively coupled to an I/O connector at the I/O panel frame and comprising:
a mounting bracket comprising a full height I/O panel sized for insertion in the I/O panel frame and comprising a top mounting panel attached to the full height I/O panel and extending orthogonally away from the full height I/O panel;
a low profile printed circuit board assembly (PCBA) physically attached to at least one of the top mounting panel and the full height I/O panel, wherein the mounting bracket and low profile PCBA define a full height expansion card, the low profile PCBA having a card edge insertably connectable to a selected one I/O connector to communicate with the enclosed components; and
a full height heat sink attached to the low profile PCBA and extending across a portion of the top mounting panel to provide increased heat dissipation for functional components of the low profile PCBA during operation of the low profile PCBA.

9. The information handling system of claim 8, wherein the expansion card further comprises a mounting plate positioned on a back side of the low profile PCBA and fastened through at least two holes in the low profile PCBA to the full height heat sink.

10. The information handling system of claim 8, wherein the low profile PCBA of the expansion card further comprises a processing component that generates heat dissipated by the full height heat sink, wherein the expansion card further comprises a battery space on the top mounting panel and a battery compartment attachable to the top mounting panel within the battery space and in electrical communication with the processing component.

11. The information handling system of claim 8, wherein the low profile PCBA of the expansion card comprises at least two mounting holes spaced for attachment to upper and lower tabs of a low profile I/O panel, and wherein the full height I/O panel of the mounting bracket comprises a pair of tabs presenting respective mounting holes identically positioned to the low profile I/O panel.

12. The information handling system of claim 11, wherein the at least two mounting holes through the low profile PCBA of the expansion card are identically spaced to at least two holes on a low profile heat sink to enable interchangeability.

13. The information handling system of claim 12, further comprising a card holder, wherein an unattached peripheral edge of the top mounting panel of the expansion card comprises an embossed surface to frictionally engage the card holder.

14. The information handling system of claim 8, wherein the full height I/O panel and the top mounting panel of the expansion card comprises a single sheet metal stamping part.

15. A method for providing a full height expansion card, the method comprising:
manufacturing a mounting bracket having (i) a full height input/output (I/O) panel sized for insertion in an I/O panel frame extended across an opening of an enclosure of an information handling system and (ii) a top mounting panel attached to the full height I/O panel and extending orthogonally away from the full height I/O panel;
physically attaching a low profile printed circuit board assembly (PCBA) to at least one of the top mounting panel and the full height I/O panel, wherein the mounting bracket and low profile PCBA define a full height expansion card; and
attaching a full height heat sink to the low profile PCBA, the full height heat sink extending across the top mounting panel, wherein the full height heat sink enables efficient dissipation of heat generated by the low profile PCBA away from one or more functional components of the low profile PCBA.

16. The method of claim 15, further comprising attaching a mounting plate positioned on a back side of the low profile PCBA by inserting fasteners that pass through respective holes in the low profile PCBA to engage the full height heat sink.

17. The method of claim 15, further comprising:
attaching, within a battery space, a battery compartment to the mounting panel; and
communicating electrical power from a battery module retained in the battery compartment to a processing component incorporated in the low profile PCBA;
wherein the processing component generates heat, and the heat that is generated by the processing component is dissipated away from the low profiled PCBA via the full height heat sink, which enables faster and more efficient heat dissipation.

18. The method of claim 15, further comprising interchangeably assembling the low profile PCBA to the mounting bracket and a low profile I/O panel by:
forming a pair of mounting holes in the low profile PCBA spaced for attachment to upper and lower tabs of the low profile I/O panel; and
fastening a pair of tabs on the full height I/O panel to the pair of mounting holes in the low profile PCBA, wherein spacing of the pair of tabs are identically positioned to those on the low profile I/O panel.

19. The method of claim 18, further comprising interchangeably assembling the low profile PCBA to the mounting bracket and a low profile I/O panel by forming at least two holes in the full heat sink in identical spacing to corresponding at least two holes in the low profile heat sink.

20. The method of claim 15, further comprising frictionally engaging a card holder to an embossed surface of an unattached peripheral edge of the top mounting panel.

\* \* \* \* \*